(12) United States Patent
Zhai et al.

(10) Patent No.: US 10,210,763 B2
(45) Date of Patent: Feb. 19, 2019

(54) VEHICLE POSITIONING AND GUIDANCE SYSTEM

(75) Inventors: Hongqiang Zhai, Ossining, NY (US); Jianfeng Wang, Ossining, NY (US); Kiran Srinivas Challapali, New City, NY (US); Dave Alberto Tavares Cavalcanti, Mahopac, NY (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 13/995,856

(22) PCT Filed: Dec. 21, 2011

(86) PCT No.: PCT/IB2011/055839
§ 371 (c)(1),
(2), (4) Date: Jun. 19, 2013

(87) PCT Pub. No.: WO2012/085851
PCT Pub. Date: Jun. 28, 2012

(65) Prior Publication Data
US 2013/0297197 A1 Nov. 7, 2013

Related U.S. Application Data

(60) Provisional application No. 61/426,233, filed on Dec. 22, 2010.

(51) Int. Cl.
| | | |
|---|---|---|
| G08G 1/00 | (2006.01) |
| B60W 30/12 | (2006.01) |
| G05D 1/02 | (2006.01) |
| B60W 30/18 | (2012.01) |
| B60W 50/00 | (2006.01) |
| B60W 50/14 | (2012.01) |

(52) U.S. Cl.
CPC ............ *G08G 1/22* (2013.01); *B60W 30/12* (2013.01); *G05D 1/0234* (2013.01); *B60W 30/18163* (2013.01); *B60W 2050/0077* (2013.01); *B60W 2050/146* (2013.01); *G05D 2201/0213* (2013.01)

(58) Field of Classification Search
CPC ........... G01C 21/28; G05D 25/00; G08G 1/22
USPC ..................... 701/514; 340/815.67
See application file for complete search history.

(56) References Cited

U.S. PATENT DOCUMENTS

| | | | |
|---|---|---|---|
| 4,309,758 A * | 1/1982 | Halsall et al. ................ 701/23 |
| 4,700,301 A * | 10/1987 | Dyke ............................ 701/25 |
| 4,729,660 A | 3/1988 | Tsumura |
| 4,806,747 A | 2/1989 | Dunavan |
| 5,144,498 A | 9/1992 | Vincent |
| 5,204,536 A | 4/1993 | Vardi |
| 5,568,137 A * | 10/1996 | Liu ............................ 340/905 |
| 6,076,040 A | 6/2000 | Akutsu |

(Continued)

FOREIGN PATENT DOCUMENTS

| | | | |
|---|---|---|---|
| EP | 1770669 B1 | 4/2007 |
| JP | 10104330 A | 4/1998 |

(Continued)

*Primary Examiner* — Todd M Melton
*Assistant Examiner* — Jason R Roberson

(57) ABSTRACT

A system for guiding a driver of a vehicle is disclosed. The system comprises a light sensor configured to detect light; and a processor configured to determine a position of vehicle on a roadway based on a characteristic of the detected light.

11 Claims, 18 Drawing Sheets

(56) References Cited

U.S. PATENT DOCUMENTS

| | | | |
|---|---|---|---|
| 6,456,910 B1* | 9/2002 | Roe | 701/23 |
| 7,147,400 B2 | 12/2006 | Van Der Poel | |
| 7,569,807 B2 | 8/2009 | Matheson | |
| 7,689,130 B2 | 3/2010 | Ashdown | |
| 8,370,028 B2* | 2/2013 | Yamada | B60Q 1/085 |
| | | | 340/988 |
| 2005/0200500 A1* | 9/2005 | Wing | 340/907 |
| 2006/0136097 A1* | 6/2006 | Kim et al. | 700/258 |
| 2008/0040029 A1* | 2/2008 | Breed | 701/208 |
| 2008/0238771 A1* | 10/2008 | Katayama | G01C 21/28 |
| | | | 342/357.31 |
| 2008/0243378 A1 | 10/2008 | Zavoli | |
| 2008/0285057 A1 | 11/2008 | Tzidon | |
| 2009/0033757 A1 | 2/2009 | Shimada | |
| 2010/0191418 A1 | 7/2010 | Mimeault et al. | |
| 2012/0076397 A1* | 3/2012 | Moresve | B64F 1/20 |
| | | | 382/153 |

FOREIGN PATENT DOCUMENTS

| | | |
|---|---|---|
| JP | 2001023078 A | 1/2001 |
| JP | 2010282522 A | 12/2010 |
| RU | 33554 U1 | 10/2003 |
| WO | 2010043815 A1 | 4/2010 |
| WO | 2012090142 A2 | 7/2012 |

* cited by examiner

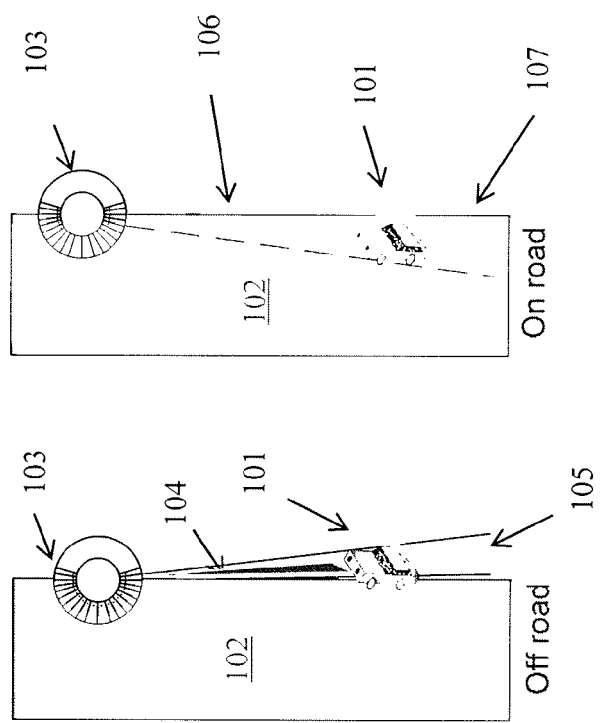

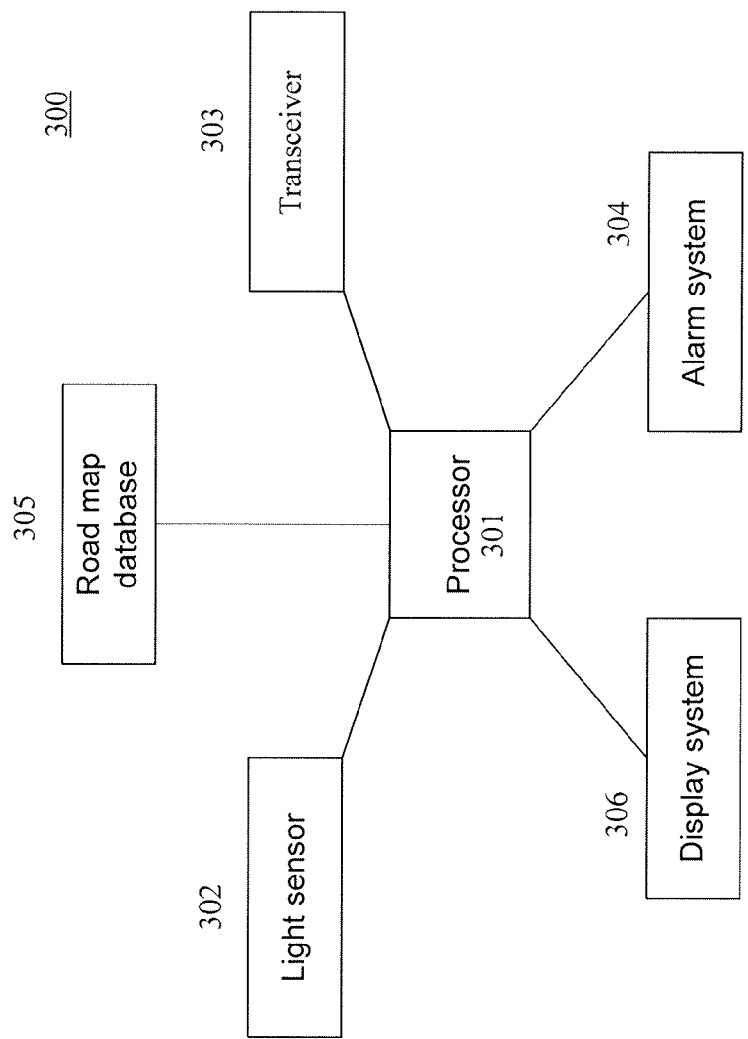

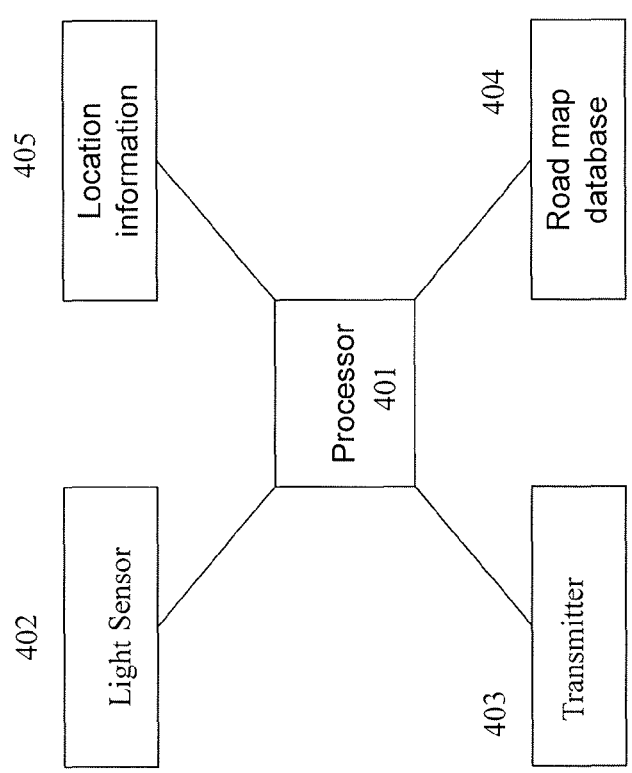

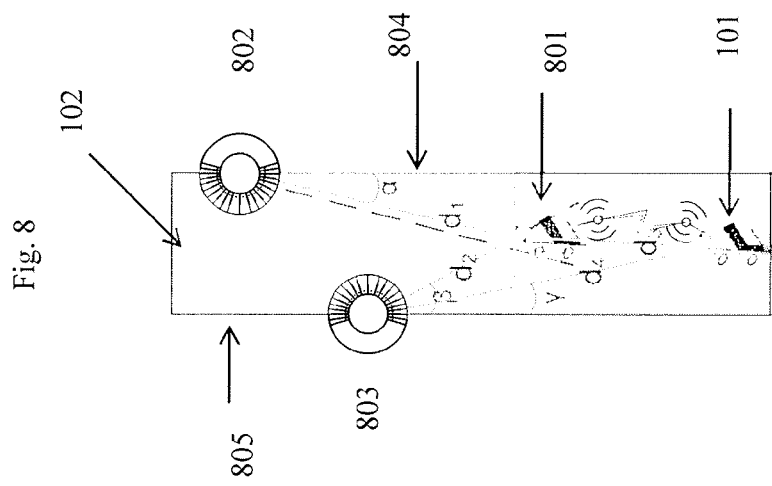

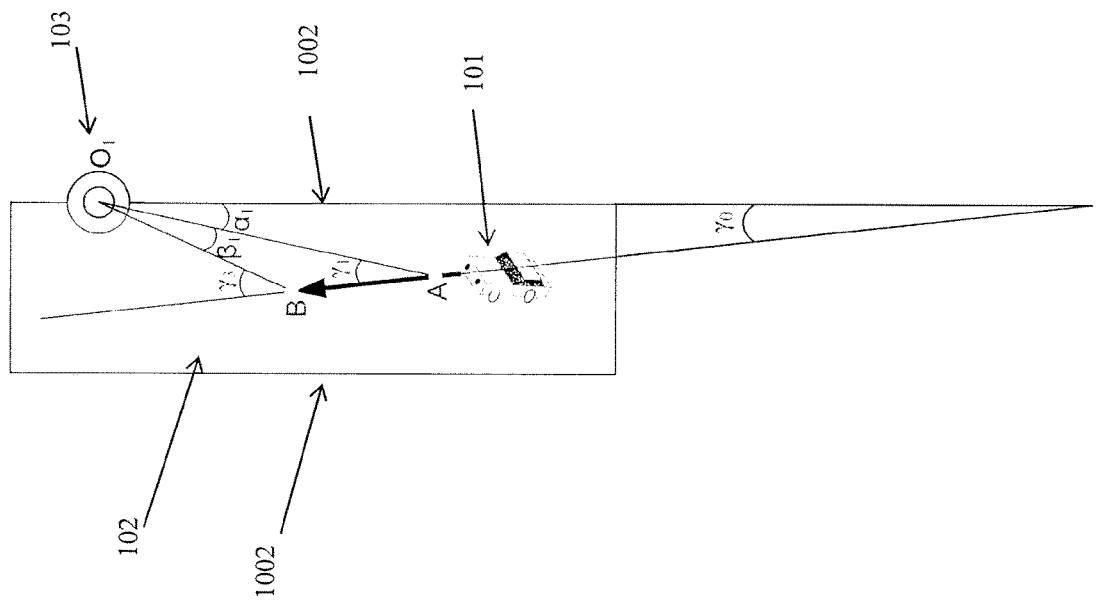

VEHICLE POSITIONING AND GUIDANCE SYSTEM

BACKGROUND

Vehicles, such as motor vehicles, are ubiquitous in daily life. Vehicles are continuously improved with consideration for the safety of the driver and passengers. One cause of accidents is failure to maintain the vehicle position on the roadway. For example, if a driver travels onto the shoulder or berm of the roadway, loss of control of the vehicle can result in an accident. Various factors can lead to a vehicle's traveling off the road including inattention by the driver to the position of the vehicle, and poor visibility due to weather, which prevents the driver from identifying lane and roadside signs. In fact, poor visibility due to heavy precipitation can prevent a driver from knowing where the interface of the roadway and the berm of the road are located. For example, in heavy snow, the painted lines delineating the interface of the paved roadway and the berm of the roadway can be completely covered by precipitation, and the driver has no visual indication of whether the vehicle is safely on the road, perilously close to the edge of the roadway, or even completely off the roadway.

Certain high-end vehicles are equipped with a camera-based system to assist the driver in maintaining the vehicle in a particular lane. The camera is mounted in the windscreen and is used to observe the lane markings. Based on feedback from the camera, the position of the car is determined relative to the edges of the roadway. If the vehicle strays out of the lane, a warning indication is provided. This system is unidirectional, and experiences performance degradation in adverse weather (e.g., snow, heavy rain) due to the limitations of resolution of the camera.

Maintaining the relative position of a vehicle or a group of vehicles with respect to the road signs/markings is also necessary to enable new intelligent transportation applications, such as vehicle convoys (or platoons) in which a group of cars are automatically operated and "drive" together as a single unit to improve overall traffic conditions, safety and easy congestion. In grouped or platooned operations of vehicles, the vehicles are clustered together in groups (e.g., 20 vehicles). The spacing between vehicles within a platoon is comparatively short, and the spacing between platoons of vehicles is comparatively long. The platoon mode of operation is conceived as a way of expanding the envelope of capacity and safety that can be achieved by vehicles. However, the limitations of drivers' ability to perceive changes in vehicle spacing, relative motion, and acceleration and their limited speed and precision of response ensure that lane capacity cannot generally exceed 2200 vehicles per hour under manual control. A smart system is needed to provide faster and more precise response than human drivers are capable of providing and the system is not influenced by fatigue or other human shortcomings. The system should be able to keep the groups of vehicles in lane and keeps a good spacing between vehicles.

What is needed, therefore, is a system for guiding vehicles and drivers that addresses at least the shortcomings of known systems described above.

SUMMARY

In a representative embodiment, a system for guiding a driver of a vehicle is disclosed. The system comprises a light sensor configured to detect light; and a processor configured to determine a position of vehicle on a roadway based on a characteristic of the detected light.

In another representative embodiment, a method of guiding a driver of a vehicle is disclosed. The method comprises receiving light at a light sensor; determining a wavelength of the light; and based on a characteristic of the light, determining a position of the vehicle.

BRIEF DESCRIPTION OF THE DRAWINGS

The present teachings are best understood from the following detailed description when read with the accompanying drawing figures. The features are not necessarily drawn to scale. Wherever practical, like reference numerals refer to like features.

FIG. 1A is a conceptual view depicting a vehicle that includes components of a system in accordance with a representative embodiment FIG. 1B is a conceptual view depicting a vehicle that includes components of a system in accordance with a representative embodiment.

FIG. 3 is a simplified block diagram of a system in accordance with a representative embodiment in accordance with a representative embodiment.

FIG. 4 is a simplified block diagram of a system in accordance with a representative embodiment in accordance with a representative embodiment.

FIG. 8 is a conceptual view of a vehicle incorporating a system in accordance with a representative embodiment.

FIG. 10 is a conceptual view of a vehicle incorporating a system in accordance with a representative embodiment.

DETAILED DESCRIPTION

Figure 1C:
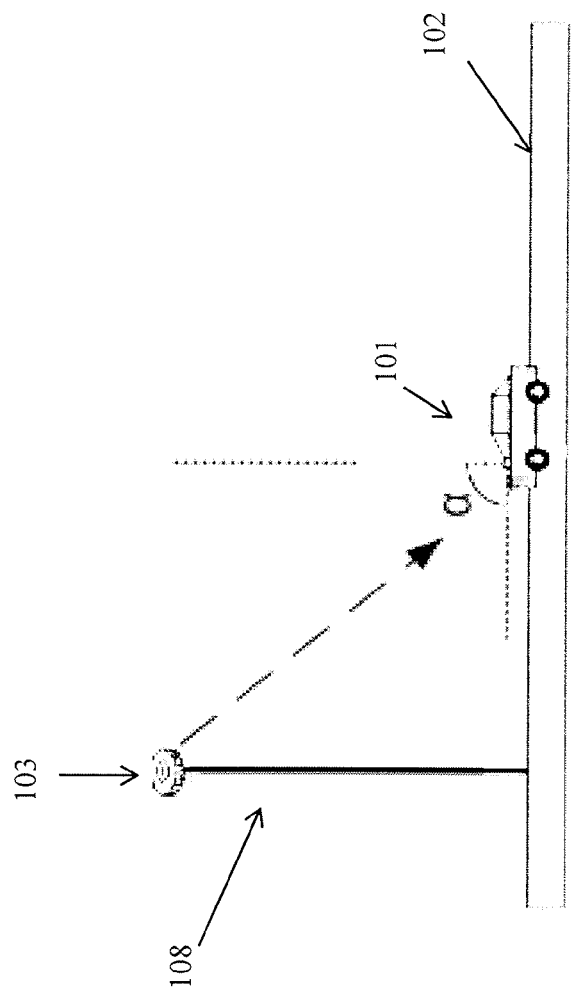
FIG. 1C is a conceptual view depicting a vehicle that includes components of a system in accordance with a representative embodiment.

In the following detailed description, for purposes of explanation and not limitation, representative embodiments disclosing specific details are set forth in order to provide a thorough understanding of the present teachings. Descriptions of known devices, operating systems, software, hardware and firmware may be omitted so as to avoid obscuring the description of the example embodiments. Nonetheless, such devices, materials and methods that are within the purview of one of ordinary skill in the art may be used in accordance with the representative embodiments.

Generally, it is understood that the drawings and the various elements depicted therein are not drawn to scale. Further, relative terms, such as "above," "below," "top," "bottom," "upper," "lower," "left," "right," "vertical" and "horizontal," are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be "below" that element. Likewise, if the device were rotated 90 degrees with respect to the view in the drawings, an element described as "vertical," for example, would now be "horizontal."

FIG. 1A is a conceptual view depicting a vehicle 101 that includes components of a system for guiding a driver of the vehicle 101 in accordance with a representative embodiment. In FIG. 1A, the vehicle 101 is shown off the roadway 102. In the representative embodiment, the vehicle is an automobile. However, other vehicles are contemplated including motorcycles and trucks. Such a system could be also implemented to guide a group of vehicles (i.e., "platooned") in a highway application to keep individual vehicles of the platoon in respective lanes and with appropriate spacing between them.

A guiding device 103 is positioned at the side of the roadway 102, for example on a light pole or other suitable structure (not shown in FIG. 1A). As will become clearer as the present description continues, the present teachings contemplate a plurality of guiding devices 103 disposed along a roadway 102, and spaced at regular or irregular distance intervals. Many details of the guiding device 103 are provided below in connection with the description of representative embodiments depicted in FIGS. 2A-2F.

In a representative embodiment, the guiding device 103 comprises a light source provided in an outdoor lighting network. Each guiding device 103 may comprise a communication device. A lighting network is formed by communicatively connecting the communication devices of the guiding devices 103. In this way, guiding devices 103 may communicate with other guiding devices 103 of the network. Guiding devices 103 may also directly communicate with one another or via a remote server (not shown). The communication devices of the guiding devices of the outdoor lighting network are configured to operate under one or more of a number of known communications protocols including IEEE 802.11 and its progeny, general packet radio service (GPRS), International Mobile Telecommunications (IMT) 2000 protocol ($3^{rd}$ generation (3G), or fourth generation (4G)), the so-called WiFi protocol, the Ethernet protocol, and one of a variety of Internet protocols. It is noted that the referenced protocols are merely illustrative and are not intended to be limiting. Generally, the guiding devices 103 comprise communications devices configured to transmit information, or receive information, or both via an appropriate communications protocol selected by the outdoor lighting network designer.

Some guiding devices 103, unable to communicate with the remote server directly, may send information to other neighboring guiding devices 103, which have direct communication channels to the remote server. These guiding devices 103 then forward the information to the remote server. The remote server may also transmit information to guiding devices 103 directly or through other guiding devices 103, which then forward the information to guiding devices 103 not in direct communication with the remote server. Additional details of the implementation of guiding devices 103 controlled in a network may be according to the teachings of commonly owned U.S. Patent Application No. 61/427603 entitled "OUTDOOR LIGHTING NETWORK CONTROL SYSTEM" filed on Dec. 28, 2010, now expired, and naming Hong Zhai, Kiran Challapali, David Cavalcanti and Jianfeng Wang as inventors. The disclosure of this patent application is specifically incorporated herein by reference.

In the present embodiment, a light beam 104 having a particular wavelength is directed over an angle 105 from the guiding device 103. A light sensor (not shown in FIG. 1A) at the vehicle 101 detects the wavelength of the light beam 104. Based on the detected wavelength a determination is made regarding the relative position of the vehicle 101 to the roadway 102. As described more fully below, the determination may be effected in a processor (not shown in FIG. 1) on the vehicle 101, or may be effected by a processor of an outdoor lighting network of which the guiding device 103 is a component. In either case, after the wavelength of light beam 104 is detected, a correlation is made between the wavelength of light detected and the position of the vehicle 101 based on the angle 105 of the light beam received at the detector of vehicle 101.

In the present example, from the wavelength of light beam 104 projected at the angle 105, the determination is made that the vehicle 101 is off the roadway 102 (e.g., traveling on the shoulder or berm of the roadway 102). The determination may be effected in a processor (not shown in FIG. 1) on the vehicle 101, or may be effected by a processor of a lighting network of which the guiding device 103 is a component after the information about detected wavelength is transmitted from the vehicle 101 to the lighting network. This information is conveyed to the driver of the vehicle 101 so that necessary corrective action can be taken. In one embodiment, this information is also conveyed to a control system of the vehicle 101 configured to take corrective action (e.g., steer the vehicle, apply the brakes, etc.) In other embodiments comprising a platoon of vehicles, the control system may be provided in one of the vehicles (e.g., the lead vehicle) or may be part of an outdoor lighting network such as described above. In embodiment comprising a single control system, information regarding corrective action may be transmitted to each of the vehicles of the platoon so that appropriate corrective action may be taken at the appropriate location.

As noted above, road conditions may prevent the driver or camera based lane-tracking systems from clearly discerning the lines that mark the side of the roadway 102 and the lines that mark the lanes or middle of the roadway 102. As described more fully below, a display may be provided in the vehicle 101 to notify the driver of what action needs to be taken to reposition the vehicle on the roadway 102. It is noted that the color of the light viewed by the driver at the particular angle 105 could also provide an indication of the location of the vehicle 101 on the roadway 102. For example, at its present position, the wavelength of the light beam 104 viewed at angle 105 may be red, indicating that the vehicle is off the roadway 102 and possibly in danger of an accident. Based on this visual reckoning, the driver could take corrective measures to reposition the vehicle 101 on the roadway 102.

FIG. 1B is a conceptual view depicting the vehicle 101 that includes components of a system for guiding a driver of the vehicle 101 in accordance with a representative embodiment. The vehicle 101 is shown properly positioned on the roadway 102. In the present embodiment, a light beam 106 of a particular wavelength is directed over an angle 107 from the guiding device 103. A light sensor (not shown in FIG. 1A) detects the wavelength of light beam 104, and based on the detected wavelength a determination is made regarding the relative position of the vehicle 101 to the roadway 102. After the wavelength of light beam 106 is determined, a correlation is made between the wavelength of light detected and the position of the vehicle 101 based on the angle 107 of the vehicle 101.

From the wavelength of light beam 106 projected at the angle 107, the determination is made that the vehicle 101 is safely positioned on the roadway 102 (e.g., traveling between the centerline and the sideline of the roadway 102). If present, this information may be conveyed to the driver of the vehicle 101 via the display (not shown in FIG. 1) to notify the driver that the vehicle 101 is properly located on the roadway 102 and therefore no corrective action needs to be taken. This information is not necessarily sent to the driver of the vehicle 101 via the display (not shown in FIG. 1) since there is no corrective action needed to be taken. Again, the color of the light of light beam 106 viewed by the driver at the particular angle 107 also provides an indication of the location of the vehicle 101 on the roadway 102. For example, in one embodiment, at its present position, the wavelength of light beam 106 viewed at angle 107 may be green, indicating that the vehicle is properly positioned on the roadway 102. In another embodiment, at its present position, the wavelength of light beam 106 viewed at angle 107 may be the typical color used by the lighting system for general illumination of the roadway 102, which indicates that the vehicle is properly positioned on the roadway 102. In representative embodiments, the guiding device is configured to provide a select number of colors, each over a predetermined angular width. When the vehicle 101 is correctly positioned one wavelength (or color (e.g., green)) is detected. As the vehicle 101 drifts out of the target position (outside the road lanes) the detector would detect different wavelengths, or the driver of the vehicle 101 would notice a different lighting pattern (e.g. colors) from the guiding device 103, or both.

FIG. 1C is a conceptual view depicting vehicle 101 that includes components of a system in accordance with a representative embodiment. The guiding device 103 is provided on a roadside structure 108, such as a utility pole. The vehicle 101 comprises a light detector (not shown in FIG. 1C) described in connection with representative embodiments below. The light detector can be installed on the top of the vehicle 101, under a windscreen, on the front surface of the vehicle 101, or any other location of the vehicle 101 suitable for detecting light from the guiding device 103.

The guiding device 103 is disposed at a sufficient height above the roadway 102 to reduce obstruction by the collection of road debris from vehicles passing by. The height of guiding device 103 on the roadside structure 108 is preferably 10 to 20 feet, or about the same height as roadside luminaries. The guiding device 103 can have a ceiling or cover above to shield dirt and debris. As noted above, a plurality of guiding devices 103 spaced at regular or irregular distance intervals are contemplated by the present teachings, with each guiding device 103 configured to communicate with the vehicle 101, or with other guiding devices 103 of the outdoor lighting network, or with a remote server, or a combination thereof.

The light detector can receive light from the guiding device 103 over an angular range α as shown. The angular range a should large enough vertically and horizontally to enable the detector to receive light and other signals from the guiding device 103 even when the car is located comparatively close to the roadside structure 108, or even under the roadside structure 108. FIG. 1 only depicts the range of angle α vertically. The angular range α can be larger for the detector to receive light from another guiding device (not shown in FIG. 1C) behind the vehicle 101.

Figure 2A:
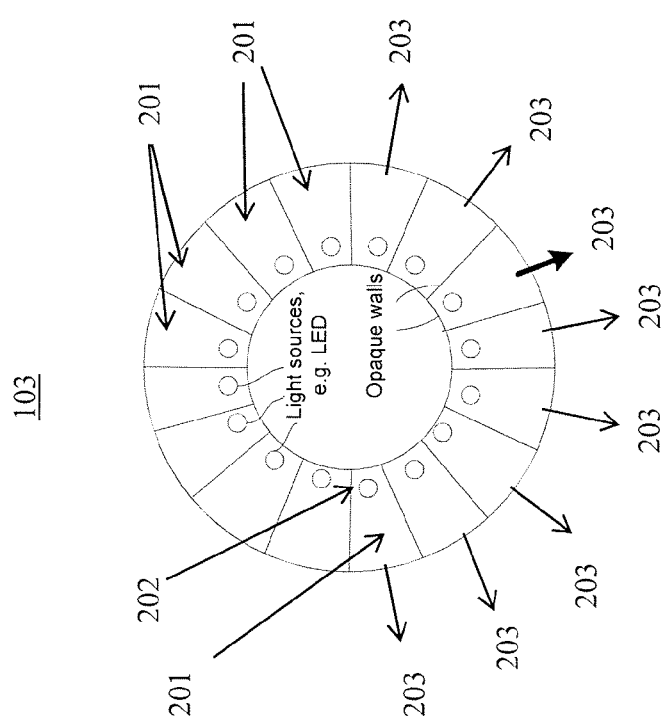
FIG. 2A depicts a top view of a guiding device in accordance with a representative embodiment.

FIG. 2A depicts a conceptual view of the guiding device 103 from above and in accordance with a representative embodiment. The guiding device 103 comprises a plurality of guiding segments 201. Each guiding segment 201 comprises a light source 202 disposed along an inner surface thereof. Each guiding segment 201 provides an individual light beam 203 from a surface opposing the light source 202. Each individual light beam 203 has a unique light characteristic over a particular angular range. As such, the guiding device 103 illustratively provides multiple unique beams of light, with each beam emitting directional light. In the depicted embodiment, the light beams 203 span a 360° arc. However, this is not imperative. Rather, the individual beams 203 of the guiding device 103 may cover an angular range from 210° to 360°. For example, the angular range is 240°. Beams in the range from 30° to 210° should direct light from the guiding device 103 towards the surface of the roadway 102.

Figure 2B:
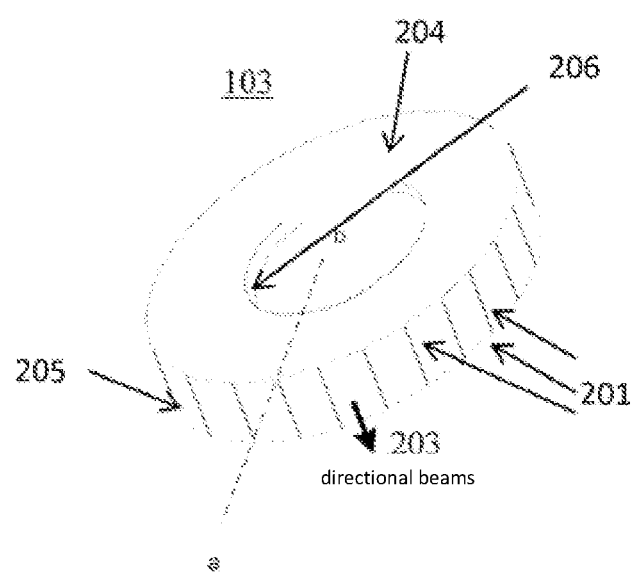
FIG. 2B depicts a perspective view of the guiding device in accordance with a representative embodiment.

FIG. 2B depicts a perspective view of the guiding device 103 in accordance with a representative embodiment. The guiding device comprises a top surface 204, and each guiding segment 201 comprises an outer surface 205 and an inner surface 206. Beams 203 are generated by light source (not shown in FIG. 2B) near the inner surface 206 of each guiding segment 201 and are emitted at the outer surface 205 of each guiding segment 201. As can be appreciated from a review of FIGS. 2A and 2B, each outer surface 205 of each guiding segment 201 is angularly offset (i.e., not co-planar) with the outer surface 205 of its adjacent guiding segment 201. This ensures that each light beam 203 is transmitted in a unique direction. Thus, directional light (beams 203) is provided from each guiding segment 201 of the guiding device 103.

Figure 2C:
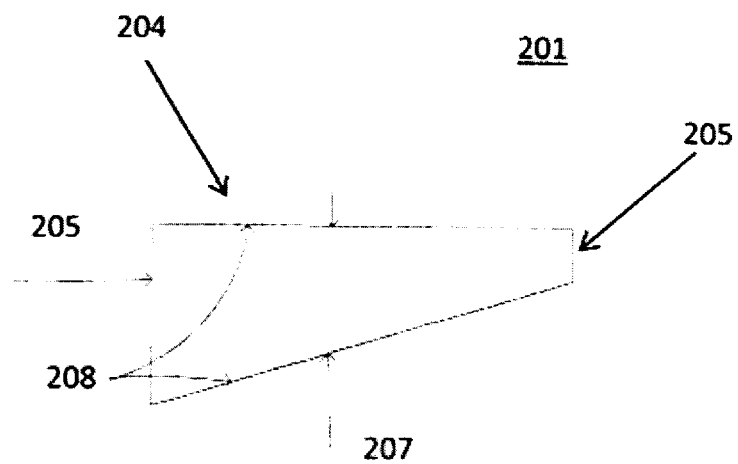
FIG. 2C depicts a cross-sectional view of a guiding section of the guiding device in accordance with a representative embodiment.

FIG. 2C depicts a cross-sectional view of one guiding section 201 along the line a-b in FIG. 2B of the guiding device 103 in accordance with a representative embodiment. The top surface 204 and an opposing bottom surface 207 are opaque. Inner surfaces 208 of the top surface 204 and the bottom surface are illustratively optically roughened to promote absorption of incident light and retard transmission of light therethrough. Similarly, inner surface 206 is also roughened to promote specular reflection of light therefrom and to retard transmission therethrough. By contrast, outer surface 205 is substantially transparent to light emitted from the light source 202, fostering the transmission of light beam 203 from each guiding segment 201.

In a representative embodiment, each guiding segment 201 is substantially hollow, with the enclosing surfaces formed from glass or suitable plastic material. Alternatively, each guiding segment 201 may be substantially solid, with all sides roughened, excepting the outer surface 205. Again, the guiding segment 201 comprises glass or suitable plastic.

It is noted that the structure and materials of the guiding segment are merely illustrative and that other structures and materials are contemplated for the guiding segments 201 of the guiding device 103.

Figure 2D:
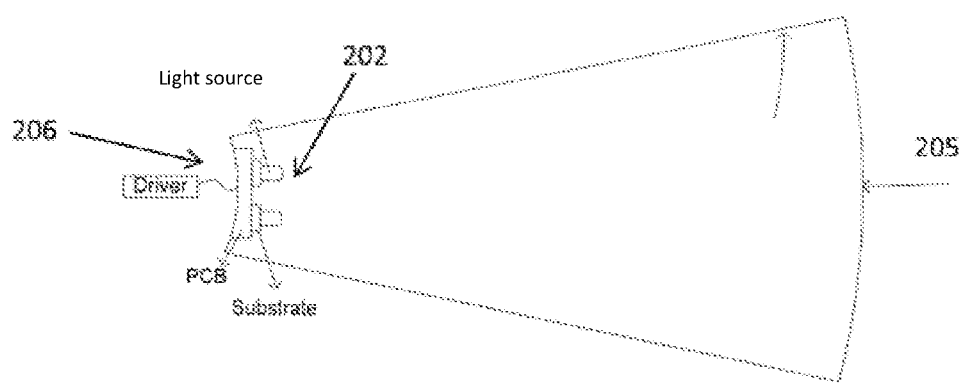
FIG. 2D depicts a top view of a guiding section of the guiding device in accordance with a representative embodiment.

FIG. 2D depicts a top view of one guiding section 201 of the guiding device 103 in accordance with a representative embodiment. The guiding section 201 comprises light source 202 disposed on the interior of the guiding section 201 and along the inner surface 206. Notably, there may be more than one light source 202, such as the depicted pair of light sources. Illustratively, the light sources 202 are light emitting diodes (LEDs). In a representative embodiment, the light source 202 may be as described in commonly owned U.S. Pat. No. 7,569,807 entitled "Light Source with Photosensor Light Guide." The disclosure of this patent is specifically incorporated herein by reference.

Each of the individual beams 203 comprises a different light characteristic over a particular angular range. For example, and as described more fully below, the light of each light beam 203 may have a unique wavelength; or the light of each light beam 203 may be code modulated light; or each light beam 203 may emit light of a unique polarization angle. In this way, each segment 201 of the guiding device 103 can be identified at a light receiver (not shown in FIG. 2A) through its unique light characteristic.

In a representative embodiment, each light beam 203 may be represented by the center value of its angular range. Beam width is defined as the width of the angular range of a light beam 203. For example, suppose the guiding device 103 comprises 60 segments 201. If the $k^{th}$ beam (where k is a positive integer and is less than or equal the total number of beams of the guiding device 103) from the $k^{th}$ guiding segment 201 has an angular range [30.0°, 36.0°], then $k^{th}$ beam is also represented by 33.0°. An angular shift between two adjacent beams is defined as the difference between the starting angles in their angular ranges. For example, if beam k has an angular range [30.0°, 36.0°] and beam k+1 has an angular range [36.0°, 42.0°], the angular shift from beam k to k+1 is 6°. In another example, if beam k has an angular range [30.0°, 39.0°] and beam k+1 has an angular range [36.0°, 45.0°], the angular shift from beam k to k+1 is still 6°.

In certain embodiments, light from two beams 203 from adjacent guiding segments 201 do not overlap or the overlapped angular range of the two beams 203 is much smaller than the angular range of the each respective light beam 203. In this case, the typical angular range for each light beam 203 is from approximately 0.1° to approximately 5.0°. For example, 0.1°, 0.5°, 1.0°, 2.0°, and 3.0° provide 0.052, 0.026, 0.52, 1.05, and 1.57 meters precision, respectively, at 30 meters away from the roadside structure 108 on which the guiding device 103 disposed. In other embodiments, lights from two or more adjacent beams do overlap. In this case, the typical angular range of each beam can be much larger, e.g., 1.0° to 60.0°. For example, if the beam width is 6.0° and the angular shift between two adjacent beams is 2.0°, each direction from the guiding device 103 is covered by 3 adjacent beams of the guiding device; and each angular range of 2.0° is covered by a unique set of three adjacent beams 203.

In another example, the beam width is 6° and the angular shift is 4°. Therefore, some angular ranges with a width of 2° are covered by only one beam and other angular ranges with the width of 2° are covered by two adjacent beams. In both examples, the accuracy is determined by the width of the angular range, i.e., 2°, which provides 1.05 meters precision at a distance of 30 meters from the guiding device 103.

In another example, the beam width is 6° and the angular shift between two adjacent beams is 5°. Therefore, some angular ranges with beam width of 4° are covered by only one beam and other angular ranges with a beam width of 1° are covered by two adjacent beams. In yet another example, the beam width is 10° and the angular shift is 2°, each angular range of 2° is covered by a unique set of five adjacent beams. In all of these examples, if an angular range is covered by two or more adjacent beams 203, the angular range can be represented by an angle (direction) with the value of the average of median values of angular ranges of these beams. For example, for three adjacent beams with angular ranges [30.0°, 39.0°], [36.0°, 45.0°], and [42.0°, 51.0°], respectively, the angular range [36.0°, 39.0°] is covered by two beams and can be represented by 37.5°; the angular range [39.0°, 42.0°] is covered by only one beam and can be represented by 40.5°; and the angular range [42.0°, 45.0°] is covered by two beams and can be represented by 43.5°. Therefore, in this example the whole angular range covered by the three adjacent beams 203 consists of multiple different angular ranges with the width of 3° instead of the beam width 9°.

In certain embodiments, light from each guiding segment 201 of the guiding device 103 has a unique wavelength over a predetermined angular breadth (e.g., directional light from the respective outer surfaces 205 of the guiding device 103). In this case, each light source 202 of each guiding segment 201 may be selected to emit a unique wavelength. Alternatively, each light source 202 may be a white light source, and a unique color filter may be provided over the outer surface 205, with each color filter configured to transmit light of a certain wavelength over a predetermined angular breadth from respective outer surfaces 205 of the guiding device 103.

In another embodiment, light source 202 of each segment of the guiding device 103 is configured to provide a uniquely modulated (coded) light beam. The coded light in each light beam 203 allows for the identification of each guiding segment 201, and using techniques such as those described below, allows the location of the vehicle 101 relative to the lanes of the roadway 102 to be determined. Moreover, coded light can also include the identification of the guiding device 103 so that the receiver on the vehicle 101 is apprised of the location of the source of the light received. The coded light may be as described in commonly owned U.S. Pat. No. 7,689,130, entitled "Method and Apparatus for Illumination and Communication" to Ian Ashdown. The disclosure of this patent is specifically incorporated herein by reference. It is emphasized that light coding techniques other than pulse-width modulation (PWM) such as disclosed in the patent to Ashdown, are contemplated for implementation according to the present teachings.

In another embodiment, visible light is used by different beams of the guiding device 103 and a driver sees different colors of light incident from different directions of the guiding device(s). The light sources of the guiding device 103 can be special light sources only used for guiding rather than general illumination. A driver sees different colors when the vehicle moves closer to the guiding device 103 along the roadway 102. The difference in these colors should be small to avoid excessive distraction to the driver. A driver can estimate where the vehicle is on the roadway 102 based on the observed colors and the observed distance from the guiding device 103. This estimation may not be accurate.

The processor either in the vehicle or in the lighting networks can derive more accurate location of the vehicle relative to light source(s) and to the edges of the roadway 102.

In another embodiment, the guiding device 103 consists of two of the above alternatives. For example, each guiding segment 201 may comprise a light source emits light of a unique wavelength, and each light beam 203 is coded with the same code that includes information identifying the location of all guiding devices 103 in a particular outdoor lighting network along the roadway 102. In another example, each guiding segment 201 is configured to emit light of a unique wavelength and a RF transmitter on the guiding device 103 or roadside structure 108 transmits RF signals with the same information in all directions (e.g., an omnidirectional antenna), which includes the identity of the guiding device 103.

Figure 2E:
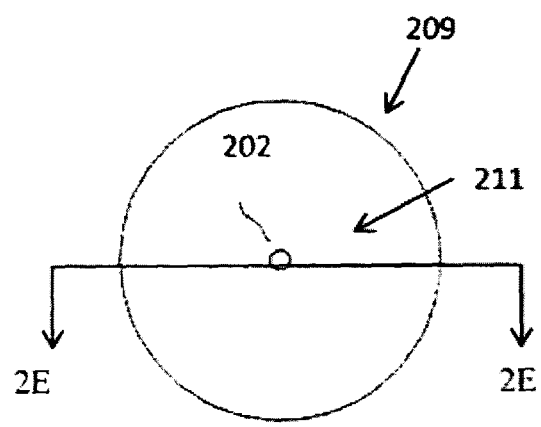
FIG. 2E depicts a top view of a guiding device in accordance with a representative embodiment.
Figure 2F:
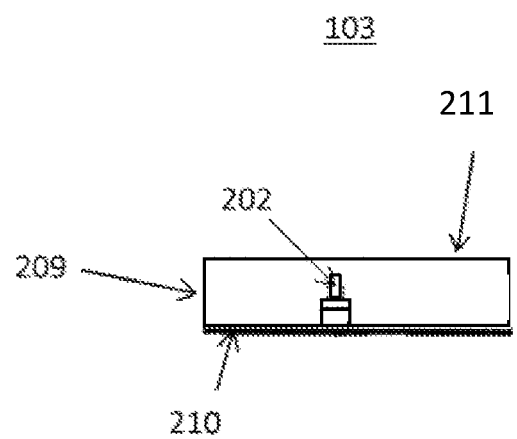
FIG. 2F depicts a cross-sectional view of the guiding device of FIG. 2E in accordance with a representative embodiment.

FIG. 2E depicts guiding device 103, and FIG. 2F depicts the guiding device 103 in cross-section taken along the line 2E-2E. In the depicted embodiment, the guiding device 103 does not comprise plurality of guiding segments (e.g., guiding segments 201). Rather, the guiding device 103 comprises an outer surface 209, which approximates a cylinder, a lower surface 210 (e.g., facing the roadway 102) and an upper surface 211. Moreover, the guiding device 103 comprises a light source (e.g., LED) 202 provided therein and configured to emit light having a unique characteristic. For example, the light source may be located at the geometric center of the guiding device 103 and may emit light having a unique wavelength, or light having a unique polarization direction, or light having a unique code (e.g., modulated light). Upper surface 211 is optically roughened to promote absorption of incident light and retard transmission of light therethrough. By contrast, the outer surface 209 and the lower surface 210 are substantially transparent to light emitted from the light source 202 disposed in the guiding device.

The guiding device 103 is configured to transmit light over a predetermined angular width. In one embodiment, the guiding device 103 is configured to emit light over 360° (i.e., omnidirectional). In other embodiments, the angular breadth is selected to enable reception of the light by light sensor located in the vehicle 101, or to be visible by the driver of the vehicle, or both.

In the embodiments described, the guiding device 103 emits light in the visible spectrum. The present teachings contemplate the transmission of electromagnetic radiation in the non-visible spectrum. Notably, each guiding device 103 comprises a plurality of emitters, with each emitter designating a particular direction from the guiding device. For example, infra-red (IR) or ultraviolet signals (UV) may be transmitted directionally from the guiding device and over a selected angular breadth. The IR or UV signal from each guiding segment 201 may be have a unique wavelength, or may have a unique modulation (code), or have a particular polarization angle indicative of the direction of its source in much the same manner that light sources 202 provide directional beams 203 of visible light. The signals emitted by the guiding device 103 are received by a detector in the vehicle, and the position of the vehicle relative to the roadway 102 is determined by techniques such as those described below.

FIG. 3 is a simplified block diagram of a system 300 for guiding a driver of a vehicle in accordance with a representative embodiment. The system 300 may be implemented completely in a vehicle (e.g., vehicle 101) and is configured to operate in connection with an outdoor lighting network that includes a plurality of guiding devices 103 along the roadway. As noted previously, the outdoor lighting network may be as described in referenced co-pending application entitled "OUTDOOR LIGHTING NETWORK CONTROL SYSTEM" or other intelligent lighting network within the purview of one of ordinary skill in the art. Certain details of aspects of the guiding device 103 are described above and are not repeated to avoid obscuring the description of the present embodiments.

The system 300 comprises a processor 301. The processor 301 may be a processor within the vehicle 101 instantiated with software (not shown) and comprising memory (not shown) to enable the calculations of the system 300 such as described below. Alternatively, the processor 301 may be a dedicated processor in the vehicle 101 instantiated with software (not shown) and comprising memory (not shown) to enable the calculations of the system 300 such as described below. Generally, the processor comprises a central processing unit (CPU) that can execute computer programs loaded therein. The processor 301 may be a microprocessor, a programmable logic device (PLD) such as a field programmable gate array (FPGA) instantiated with necessary cores to effect the calculations of the system 300.

When using a processor or CPU, a memory (not shown) is included for storing executable software/firmware and/or executable code that determines the position of the vehicle 101 relative to the edges or lanes of the roadway 102. Additionally, the memory stores software/firmware and/or executable code to display the recommended position of the vehicle 101, or to provide instructions to the driver (e.g., visual or audio, or both) to adjust the position of the vehicle 101 on the roadway 102. The memory may be any number, type and combination of nonvolatile read only memory (ROM) and volatile random access memory (RAM), and may store various types of information, such as computer programs and software algorithms executable by the processor or CPU. The memory may include any number, type and combination of tangible computer readable storage media, such as a disk drive, an electrically programmable read-only memory (EPROM), an electrically erasable and programmable read only memory (EEPROM), a CD, a DVD, a universal serial bus (USB) drive, and the like.

The system 300 comprises a light sensor 302 electrically connected to the processor 301. The light sensor 302 detects light from the guiding devices 103 disposed along the side of the roadway 102. Illustratively, the light sensor 302 comprises a semiconductor light detector or an array of semiconductor detectors. Generally, the light sensor 302 is configured to sense light of each wavelength, code or polarization angle emitted from the guiding device 103. For example, in an embodiment, where the guiding device 103 emits light over six respective (6) angular ranges, the light sensor 302 would be able to detect each of the six wavelengths of light emitted. As alluded to above, based on the detected wavelength (or other unique characteristic of light), a determination is made of the position of the vehicle 101 relative to the roadway 102.

In certain embodiments, as noted above the light received by the light sensor 302 can have unique wavelengths, or can be modulated (coded light) with unique pattern, or have a unique polarization angle. The light sensor 302 is configured to detect and differentiate the light coming from the guiding device 103 based on its unique characteristic (e.g., wavelength, polarization or code). In certain embodiments, the light sensor 302 is configured to determine the wavelength, or other characteristics of the light from the guiding device 103. The light sensor 302 provides data of the wavelength or other characteristic of the light detected to the processor 301.

The processor 301 then determines the position of the vehicle 101 on the roadway 102 based on these data by methods such as those described below.

Light reflection may aid the light sensor 302 in detecting the light with unique wavelength or being modulated with unique pattern if the line of sight between the guiding device 103 and the light sensor 302 is blocked. In other embodiments, the light sensor 302 directionally receives light from the guiding device 103 and beneficially does not receive a significant portion of light reflected from the roadway 102. In certain embodiments, the light sensor 302 could be surrounded by an envelope which blocks light from certain angles. Alternatively, the light sensor 302 may determine whether a light is reflected from the face of the roadway 102 or from a roadside light source based on the angle of incidence. For example, the light sensor 302 may comprise multiple sensors, which are embedded on the surface of a sphere with the shape of a round ball. Each sensor only receives light along the direction from its position to the center of the ball. In this way, the incoming direction of light can be detected by checking which sensor receives the light. Sensors may only be embedded on a part of the sphere surface to receive light from certain directions.

In one embodiment, light sensor 302 consists of one or multiple photodiodes, such as are commercially available from Pacific Silicon Sensor Incorporated, Westlake Village, Calif. USA. Photodiodes can act as optical filters to control the spectral bandwidth of light. Each photodiode is able to detect a narrow spectrum band. Multiple photodiodes are packed together to differentiate multiple wavelengths.

In another embodiment, light sensor 302 comprises a light spectrum analyzer, which utilizes the dispersion phenomena of light as it travels through a triangular prism. The obtained light spectrum is used to check whether there are pulses of the predefined set of wavelengths used by light source(s).

In another embodiment, the light sensor 302 could demodulate (decode) the received light, which is modulated at the guiding device 103. After the demodulation, the light sensor 302 obtains the information including the beam number or the direction from which the beam originated and optionally the identification of the guiding device 103.

Other illustrative embodiments the light sensor 302 may as described in U.S. Pat. No. 5,144,498, entitled "Variable Wavelength Filter and Sensor System"; and U.S. Pat. No. 4,806,747, entitled "Optical Direction of Arrival Sensor with Cylindrical Lens." The disclosures of these patents are specifically incorporated herein by reference.

In certain embodiments, light sensor 302 can be connected to or be a part of a GPS device, a cell phone device, an mp3 player, or any other handheld devices instead of being integrated in the car. These devices may be put under the windshield, on the surface of the car, or any other places in and out of the car where they can receive the light and/or signals from guiding devices along the roadway 102.

In an embodiment, the system 300 comprises a transceiver 303. The transceiver 303 may be one of a variety of transceivers suitable for use in effecting communication between the vehicle 101 and the lighting network that comprises the guiding device 103. In a representative embodiment, the transceiver 303 is associated with the vehicle 101. Notably, the transceiver 303 may be disposed on or in the vehicle 101. In certain embodiments, the transceiver 303 is configured to provide the position data of the vehicle from the processor 301 to the network. Additionally or alternatively, the transceiver 303 can transmit data of the wavelength and other characteristics of light detected by the light sensor 302 directly to the network.

In one embodiment, the transceiver 303 transmits data of the wavelength or other characteristics of light detected by the light sensor 302 directly to the optical lighting network. The determination of the vehicle's location is effected at a processor in the optical lighting network. If the vehicle 101 is on the roadway 102, the optical lighting network optionally uses a transmitter at a light pole to transmit the location information to the vehicle, so that the driver of the vehicle is apprised of the position of the vehicle (e.g., what lane). If the vehicle 101 is off the roadway 102, the optical lighting network can transmit this information to the vehicle 101 and alert the driver of the vehicle. This information may also be transmitted to other vehicles on the roadway 102 and to emergency personnel as well.

In an embodiment the transceiver 303 may be co-located with or be an integral part of the guiding device 103 so that data from the system 300 can be received. The transceiver 303 may provide an identification code or other indicia to identify the particular vehicle that is transmitting the data. In this way, the location of the vehicle 101 relative to the particular guiding device 103 can be determined. This location information could be used to alert emergency personnel that the vehicle 101 has gone off the roadway 102 and provide its location.

The transceiver 303 is configured to receive locations (e.g., GPS coordinates) of the guiding device(s) 103, local road map data, local traffic data, and any other road and traffic related information. This information can be provided from the lighting network that comprises guiding device(s) 103. The location coordinates of the guiding device(s) combined with the relative location from the vehicle to the guiding device(s) are used to derive the accurate location coordinates of the vehicle. The location coordinates of the vehicle are used to compare the location data of the roadway 102 and hence display the road map together with the vehicle's position on the map. The guiding device(s) may have updated local road map data due to recent constructions and current accidents, which are transmitted to the vehicle to obtain a more informative display of the vehicle's position together with the road map.

The transceiver 303 may be a wireless transceiver such as a radio frequency (RF) transceiver configured to communicate directly with transceivers of the lighting network or via a wireless network. For example, the transceiver 303 may be a node of a wireless communication network, such as a mobile telephone network. It is also contemplated that the transceiver 303 is configured to communicate with similar transceivers in other vehicles in order to transmit its position data and to receive the position data of other vehicles.

In an embodiment, the system 300 includes an alarm system 304. The alarm system 304 is configured to receive an alert signal from the processor 301 and to provide an alarm message to the driver. The alert signal is generated in the processor 301 and indicates that the vehicle is in a perilous position (e.g., off the roadway 102). The alert signal is determined from the wavelength of the light detected by the light sensor 302. The alarm system 304 may provide an audio alarm, or a visual alarm, or both, to the driver of the vehicle 101. The alarm system 304 may be configured to provide information on road conditions, road work areas and accident information. Such information is provided by the processor 301 and is received, for example, from one of a variety of sources within the lighting network. In one embodiment, this information is provided to all vehicles of a group (platoon) traveling on the roadway 102. In another embodiment, such information together with vehicle(s) location(s) on the roadway 102 is transmitted to other vehicles in a network and is used to keep vehicle(s) in certain lanes to avoid accidents due to bad road conditions and road construction either through the alarms to the driver and the driver's responses to the alarms or through the automatic control system of vehicle(s).

In an embodiment, the system 300 includes a roadmap database 305. The roadmap database 305 illustratively comprises a GPS database including GPS data and the locations of guiding device(s) 103 of the lighting network.

The roadmap database 305 functions in conjunction with a display system 306, which displays the road map data from the roadmap database 305. The display system 306 displays the current vehicle position relative to the roadway 102, its GPS location and the position of nearby guiding devices 103 of the lighting network. Moreover, the display system 306 is configured to provide the visual alarm from the alarm system 304. In an embodiment, the display system 306 uses the display on the dashboard of the car. In another embodiment, the display system uses the external display, such as displays of smart phones and standalone GPS devices, by using cables or wireless transmission (e.g., Bluetooth communication) to connect the external displays.

FIG. 4 is a simplified block diagram of a system 400 for guiding a driver of a vehicle in accordance with a representative embodiment. The system 400 comprises many of the components of system 300 described previously. Notably, the system 400 is less complex than system 300 and foregoes some of the functionality of system 300. Nevertheless, the system 400 provides a useful tool for guiding a driver of a vehicle on a roadway 102. Like system 300, the system 400 may be implemented completely in the vehicle (e.g., vehicle 101) and is configured to operate in connection with a lighting network (not shown) that includes guiding devices (e.g., a plurality of guiding devices 103) along the roadway 102. Certain details of aspects of the lighting network and the guiding devices are described above and are not repeated to avoid obscuring the description of the present embodiments.

The system 400 comprises a processor 401. The processor 401 may be a processor within the vehicle 101 instantiated with software (not shown) and comprising memory (not shown) to enable the calculations of the system 300 such as described below. Alternatively, the processor 401 may be a dedicated processor in the vehicle 101 instantiated with software (not shown) and comprising memory (not shown) to enable the calculations of the system 300 such as described below. Generally, the processor 401 comprises a central processing unit (CPU) that can execute computer programs loaded therein. The processor 301 may be a microprocessor, a programmable logic device (PLD) such as a field programmable gate array (FPGA) instantiated with necessary cores to effect the calculations of the system 300. Many of the details of the processor 401 are common to those of processor 301 and are not repeated to avoid obscuring the presently described embodiments.

The system 400 comprises a light sensor 402 electrically connected to the processor 401. The light sensor 402 is substantially identical to light sensor 302 described above. As such, the light sensor 402 collects light from the guiding device 103 disposed along the side of the roadway 102. The light sensor 402 directionally receives light from the guiding device 103 and beneficially does not receive a significant portion of light reflected from the roadway 102. Illustratively, the light sensor 402 comprises a semiconductor light detector or an array of semiconductor detectors. Generally, the light sensor 402 is configured to sense light of each wavelength of light emitted from the guiding device 103.

In an embodiment, the system 400 comprises a transmitter 403. The transmitter 403 may be a wireless transmitter such as a radio frequency (RF) transmitter configured to send data from the vehicle 101 to a receiver (not shown in FIG. 4) of the lighting network. The transmitter 403 is adapted to transmit the unique characteristic(s) (e.g., wavelength, code, polarization angle) of the light most recently received from guiding device 103 to the receiver. A processor on the network (e.g., located at the guiding device 103) can then determine whether the vehicle 101 is off the roadway 102 or on the roadway 102 by methods such as those described below. This information may be put to further use by the lighting network. For example, if the vehicle is off the roadway 102, an alert message may be sent to emergency personnel. Notably, the location of the vehicle relative to the nearest guiding device 103 can be determined based on information provided by the transmitter 403 of the vehicle 101. This information may include GPS positioning information from the vehicle, for example. Alternatively, if no GPS position information is available, the location of the vehicle can be determined from the location of the receiver that received the transmitted data from the transmitter 403. Generally, the range of transmission of the transmitter 403 is selected so that only one receiver (e.g., located at one guiding device) will receive the signal from the transmitter. Based on the location of the receiver that receives the signal and the maximum range of the transmitter, the approximated location of the vehicle 101 can be determined. Notably, the transmitter 403 provides the wavelength data received by the light sensor 402 from the nearest guiding device 103 continually so that the nearest receiver associated with the nearest guiding device 103 receives the data.

In an embodiment, each vehicle 101 transmits an identifying code (e.g., vehicle identification number (VIN)) together with the location of the vehicle 101. In another embodiment, each vehicle uses a unique identification code of the transmitter (e.g., medium access control (MAC) address, which is unique for each transmitter 403) as identification of the vehicle, and the identification code together with the vehicle is registered within the outdoor lighting network (or other communication networks used for the communication to management center or the authorities). Additionally, the present teachings contemplate that each transmitter 403 provides a unique identifying code for each vehicle 101. Each vehicle 101 is registered within the lighting network, so not only is the location of the vehicle known, but also other indentifying information (e.g., owner, make and model of the vehicle). In one embodiment, this information is provided by the transmitter 403 only in case the car detection system detects that it is moving off of the roadway 102. In another embodiment, this information is provided by the transmitter 403 only when the information is requested by the authorities or management center through any communication channel (such as the outdoor lighting network, cellular networks, dedicated short range communication (DSRC)). In another embodiment, this information is provided by the transmitter 403, with the receiver associated with the nearest guiding device 103 adapted to receive the information. This identifying information can be used to locate a particular vehicle if the vehicle becomes disabled, or its location is needed by the authorities (e.g., in a so-called Amber-Alert scenario in the U.S.).

It is emphasized that the transmitter 403 is not necessary to the system 400. Notably, the processor 401 could determine the relative position of the vehicle 101 on the roadway 102 (e.g., off the road) based on the unique characteristics of the detected light (e.g., wavelength), and present the driver of the vehicle with this information so that corrective action can be taken. For instance, continuing with a previous example, a display in the vehicle 101 could be used to show a red light if the vehicle 101 is off the roadway 102, or a green light if the vehicle is safely on the roadway 102.

In an embodiment, the system 400 comprises optional roadmap database 404. The roadmap database 404 illustratively comprises a GPS database including GPS data and the locations of guiding device(s) 103 of the lighting network. The roadmap database 404 may be configured to function with a display (not shown in FIG. 4) to display the current vehicle position relative to the roadway 102, its GPS location and the position of nearby guiding devices 103 of the lighting network.

The system 400 comprises an optional location information unit 405 that comprises a memory to store location information (e.g., GPS coordinates) of the each of the guiding devices 103 along the roadway 102. Normally, the location information stored in the location information unit 405 is stored in the unit when a particular guiding device 103 is installed, and could be updated if the position of the guiding device 103 is changed. In case that the vehicle does not have locations of guiding devices or newly updated locations of guiding devices 103, the location information of guiding devices can be transmitted to the vehicle 101. The location information of the guiding devices 103 can be used to determine the vehicle's location combined with the derived relative position of the vehicle 101 to the guiding device 103. The determination process can be done at the vehicle 101 or at the guiding device 103.

Figure 5:
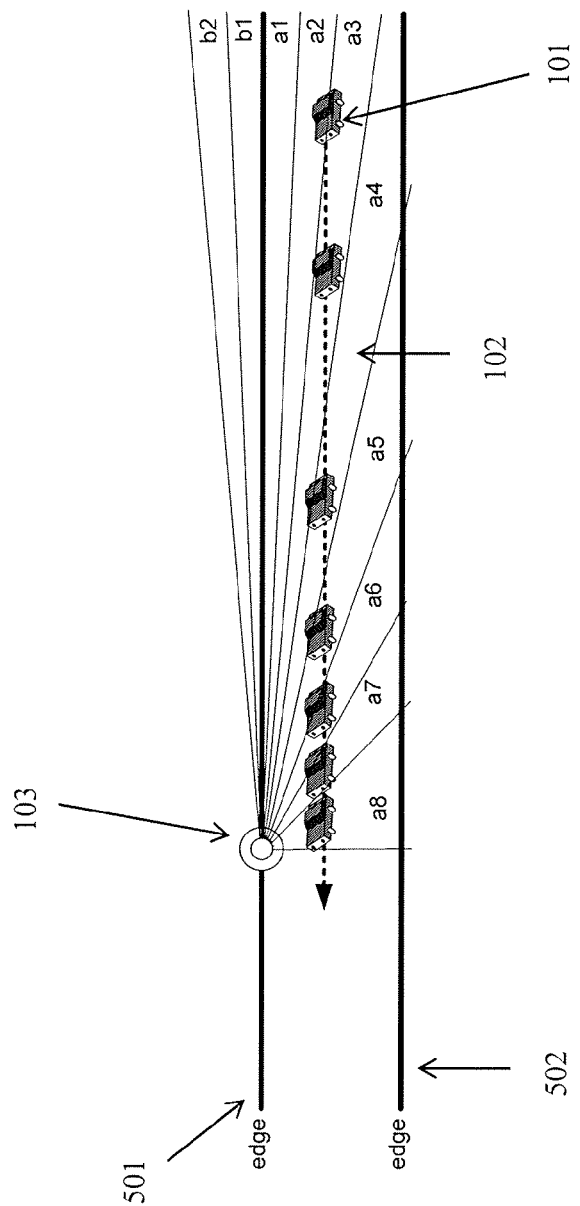
FIG. 5 is a conceptual view of a vehicle incorporating a system in accordance with a representative embodiment.

FIG. 5 is a conceptual view of a vehicle 101 incorporating a system in accordance with a representative embodiment. The system is illustratively system 300 or system 400 or variants thereof in keeping with the present teachings.

The vehicle 101 is traveling along the roadway 102. The roadway 102 comprises a first edge 501 and a second edge 502. The first edge 501 is illustratively adjacent to a shoulder or berm in the roadway 102. The second edge 502 is either a centerline of the roadway 102 or is adjacent to another shoulder or berm.

The guiding device 103 emits light of different wavelengths at different angular sections as shown. Illustratively, the guiding device 103 emits light beams a1~a8 of eight (8) discrete wavelengths in angular sections that span 90°. Similarly, the guiding device 103 emits light beams b1~b2 of eight discrete wavelengths in angular sections that span approximately 30°. As each wavelength provides light of a different color, in the present illustration, there are 10 colors that can be detected by the light sensor (e.g., light sensor 302) of the vehicle 101 as it travels along the roadway 102 in the direction shown. As will become clearer as the present description continues, light beams a1~a8 are useful in indicating to the driver that the vehicle 101 is "on the road" and light beams b1~b2 are useful in indicating to the driver that the vehicle 101 is "off the road." Moreover, the relative position of the vehicle on the roadway 102 can be further discriminated based on the actually detected wavelength (and thus the actual angular portion of light). For example, if the light sensor 302 detects light having wavelength a1 at any point along the 90° quadrant including light beams a1~a8, it can be determined that the vehicle 101 is closer to edge 501, than if the light sensor 302 detects light beam a3.

It is emphasized that the transmission of light beams (e.g., light beams a1~a8) of different wavelengths is merely illustrative and that other unique characteristics of the light may be transmitted. For example, the guiding device may transmit light beams (e.g., designated a1~a8, b1~b2) with ten different angles of polarization, and the determination of the location of the vehicle 101 made from the received light beams unique polarization angles.

The vehicle 101 travels from right to left in FIG. 5 along the path depicted by the dotted line. Each angular segment and therefore direction from the guiding device 103 is represented by light beams a1~a8 and b1~b2 of different wavelengths. In certain embodiments, the light emitted from the guiding device 103 is visible light, and can be observed by the driver in the direction of travel shown. The vehicle 101 detects light of different wavelengths as it travels along the path shown. For example, as the vehicle 101 travels along the path depicted, the light sensor 302 initially detects light beam a2 from the guiding device 103 having a unique wavelength; then the light sensor 302 detects light beams a3, a4, a5, a6, a7, and a8 from the guiding device 103 each of a unique wavelength in sequence. Based on the detected wavelength, the processor 301, for example, calculates the position of the vehicle 101 relative to the edges 501, 502 of the roadway 102. Moreover, the detected wavelengths can be transmitted by the transceiver 303 to a receiver (not shown in FIG. 5) associated with the guiding device 103. As described above, the transmitted wavelengths can be used to determine the position of the vehicle 101 and this information can be provided back to the vehicle 101, or to other recipients (e.g., emergency personnel).

If vehicle 101 were "off the road" and has traveled outside the edge 501, light beams b1~b2 (each of a unique wavelength) would be detected by the light sensor 302. Based on the detected wavelengths, the processor 301, for example, calculates the position of the vehicle 101 relative to the edge 501 of the roadway 102. The detected wavelengths can be transmitted by the transceiver 303 to a receiver (not shown in FIG. 5) associated with the guiding device 103. As described above, the transmitted wavelengths can be used to determine the position of the vehicle 101 and this information can be provided back to the vehicle 101, or to other recipients (e.g., emergency personnel).

Figure 6:
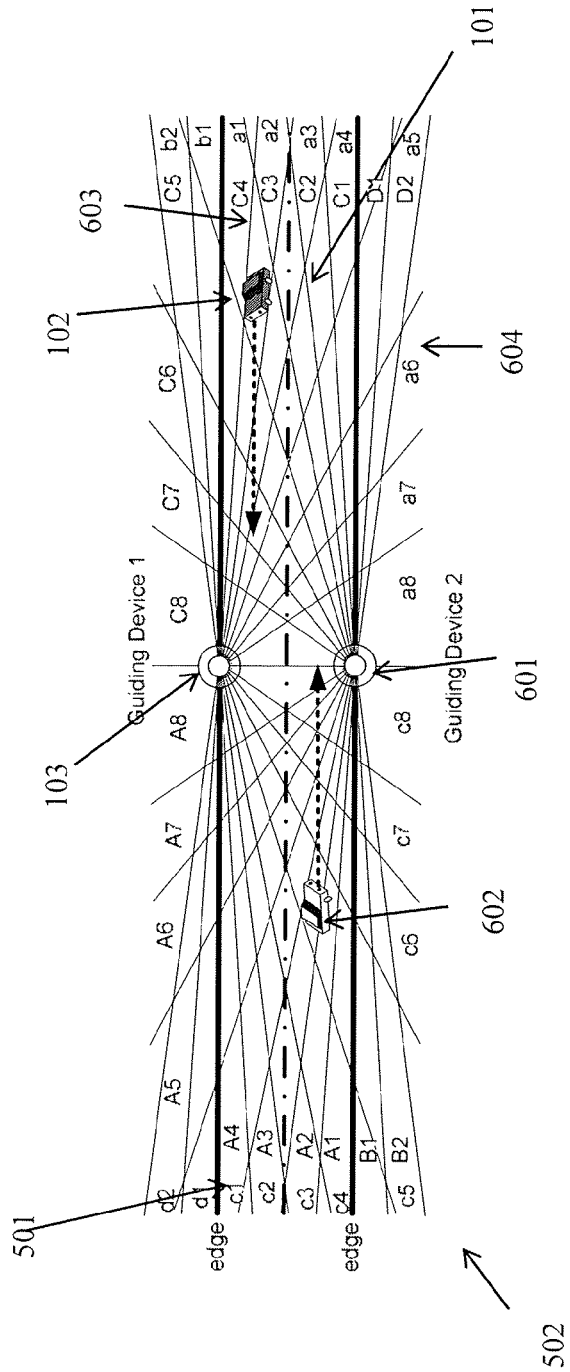
FIG. 6 is a conceptual view of a vehicle incorporating a system in accordance with a representative embodiment.

FIG. 6 is a conceptual view of a vehicle 101 incorporating a system in accordance with a representative embodiment. The system is illustratively system 300 or system 400 or variants thereof in keeping with the present teachings.

The vehicle 101 is traveling along the roadway 102. The roadway 102 comprises first edge 501 and second edge 502. The first edge 501 is illustratively adjacent to a shoulder or berm in the roadway 102. The second edge 502 is either a centerline of the roadway 102 or is adjacent to another shoulder or berm.

The guiding device 103 is disposed along first edge 501 of roadway 102 and emits light of different wavelengths at different angular sections as shown. Illustratively, the guiding device 103 emits light beams having twenty (20) discrete wavelengths a1~a8, c1~c8, b1, b2, d1, d2 in angular sections that span, for example 240°. Generally, guiding device 103 emits light beams having twenty (20) discrete wavelengths a1~a8, c1~c8, b1, b2, d1, d2 in angular sections that span greater than 180°. Another guiding device 601, which is substantially identical to guiding device 103, is provided along the second edge 502 of the roadway 102. Guiding device 601 emits light beams twenty (20) discrete wavelengths A1~A8, C1, C2, B1~B8, D1, D2 in angular sections that span 180°.

As can be appreciated from a review of FIG. 1, each point on the roadway 102 is illuminated by two wavelengths of light, one wavelength from the guiding device 103 and one wavelength from guiding device 601. The vehicle 101 travels from right to left in FIG. 6 along the path depicted by the dotted line. At each location along the dotted line, light from guiding devices 103, 601 are detected by the light sensor 302. So, as the vehicle 101 drives towards a guiding device 103, beams a1~a8 are detected in sequence by the light sensor 302 from guiding device 103 on its right side of the roadway 102, and beams C1~C8 are detected in sequence by the light sensor 302 from guiding device 601 on its left side.

For example, the vehicle 101 driving from right to left in the figure observes beam a2 from guiding device 1 and beam C4 from guiding device 2 at its current point. This detection of light can be represented as wavelength pair (a2, C4) and represents a position on the roadway 102. Vehicle 102 driving from left to right in FIG. 6 detects beam A3 from guiding device 2 and beam c5 from guiding device 1 at its current point. This detection of light can be represented as wavelength pair (a3, C5) and represents a position on the roadway 102

Because of the order pairing of light beams of particular wavelengths is transmitted to each point of the roadway 102, the location of the vehicle 101 on the roadway 102 can be more accurately determined. For example, if vehicle 101 is closer to edge 501, such as at point 603 on the roadway 102, the wavelength pair of light (a1, C4) would be detected by the light sensor 302. Similarly, if the vehicle 101 is close to second edge 502, such as at point 604 on the roadway 102, the wavelength pair (a4, C1) would be detected by the light sensor 302. If the light from the guiding devices 103, 601 is visible light, the driver observes the two different colors of light from the guiding devices 103, 601 at point 603, and two different colors of light from guiding devices 103, 601 at point 604.

The detected order pair of wavelengths of light from guiding devices 103, 601 can be used by the processor 301, for example, to calculate the position of the vehicle 101 relative to the edges 501, 502 of the roadway 102. Moreover, the detected wavelength pairs can be transmitted by the transceiver 303 to a receiver (not shown in FIG. 5) associated with the guiding device 103, or the guiding device 601, or both. The transmitted wavelength pair can be used by the lighting network to determine the position of the vehicle 101 and this information can be provided back to the vehicle 101, or to other recipients (e.g., emergency personnel). So, continuing with the present example, if the transmitted order pair were (b2, C5), it could be determined by the processor 301, or by the lighting network that the vehicle 101 has gone off the roadway 102 from edge 501. The processor 301 determines the position of the vehicle 101, converts this to location coordinates (e.g., GPS coordinates) and displays the position of the vehicle on the display system 306. In this particular instance, the processor 301 could send an alert signal to the alarm system 304 and a visual alarm, or an audio alarm, or both can be provided for the driver's benefit.

EXAMPLES

Examples of the application of the principles of the present teachings are presented below. These examples are intended to illustrate various implementations of systems 300, 400 and detail certain benefits. These examples are intended only to illustrate applications of the present teachings, and are not provided in a limiting sense.

Example I

Figure 7:
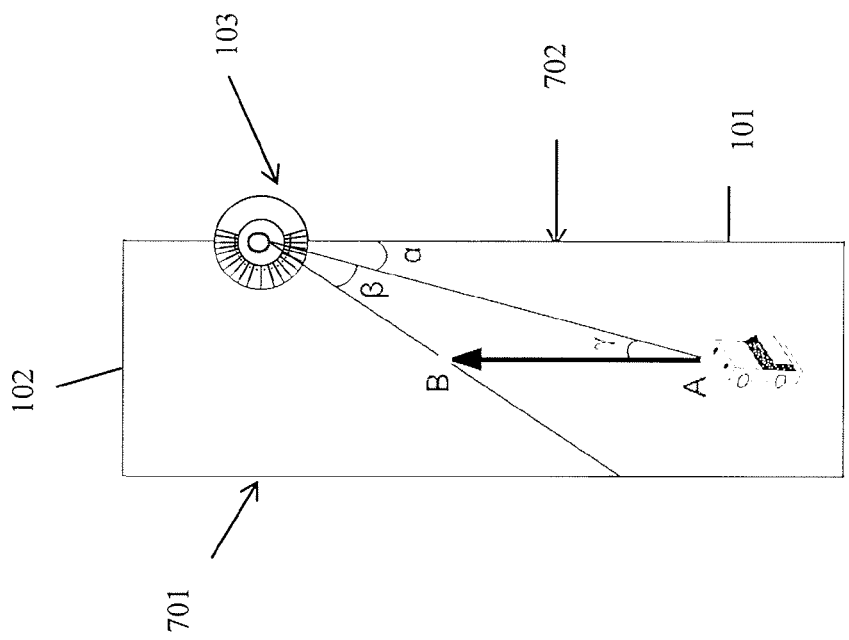
FIG. 7 is a conceptual view of a vehicle incorporating a system in accordance with a representative embodiment.

FIG. 7 is a conceptual view of a vehicle 101 incorporating a system in accordance with a representative embodiment.

The vehicle 101 is traveling along roadway 102 and ideally between a first edge 701 and a second edge 702 of the roadway 102. The guiding device 103 is provided along the second edge 702 of the roadway 102. In this example, the vehicle 101 travels from point A to point B on the roadway 102 as depicted in FIG. 7. At point A, light of a first wavelength is detected by the light sensor 302 at an angle α. At point B, light of a second wavelength is detected by the light sensor 302 at an angle α+β. The processor 301 determined the angle β. The angle γ represents the angle between the guiding device 103 and the vehicle 101's moving direction. The processor 301 then calculates the distance between point A and point B and determines lengths OA and OB using the triangular relationship. Points OA and OB represent the position of the vehicle 101. The processor 301 determines the position of the vehicle 101, converts this to location coordinates (e.g., GPS coordinates), and displays the position of the vehicle on the display system 306. The driving distance from A to B is known to the vehicle by using an approach similar to the mileage meter:

$$OA = AB \times \frac{\sin(\beta + \gamma)}{\sin(\beta)}; OB = AB \times \frac{\sin(\gamma)}{\sin(\beta)}.$$

The distance to the right edge at point A is OA×sin(α) and the distance to the right edge at point B is OB×sin(α+β).

Example II

FIG. 8 is a conceptual view of vehicles 101, 801 which both incorporate a system in accordance with a representative embodiment. As shown, vehicle 101 is traveling behind vehicle 801 on the roadway 102. Using transceiver 303, vehicle 101 transmits a request for the position of vehicle 801. Vehicle 801 transmits its position (e.g., GPS coordinates), the distance $d_1$ between vehicle 801 and a first guiding device 802, the distance $d_2$ between the vehicle 801 and a second guiding device 803 and angles α and β. Each vehicle can measure the distance $d_3$ between vehicle 101 and vehicle 801 according to the expression:

$$d_3 = \sqrt{d_2^2 + d_4^2 - 2 \times d_2 \times d_4 \times \cos(\beta - \gamma)}$$

If somehow, vehicle 101 has difficulty receiving light from guiding device 802, the processor 301 can determine the position of vehicle 101 relative to the edges 804, 805 of the roadway 102 using $d_1$, $d_2$, α, β, $d_3$ and some triangle relationships between these variables. The distance form the vehicle 101 to the right edge 804 of the roadway 102 is approximately: $d_1 \sin(\alpha) + d_2 \sin(\beta) - d_4 \sin(\gamma)$, and the distance from the vehicle 101 to the left edge 805 of the roadway 102 is $d_4 \sin(\gamma)$.

Any two adjacent beams may overlap to some extent, i.e., some areas may be covered by light from two adjacent beams. If the detector at the vehicle detects light from two adjacent beams of the guiding device and these two beams correspond two angles $α_1$ and $α_2$, respectively, the detector should conclude that the angle is given by:

$$\frac{\alpha_1 + \alpha_2}{2}$$

for light coming from the guiding device 103. In general, any two or more adjacent beams of a guiding device 103 may overlap, i.e., some areas may be covered by light from two or more adjacent beams. If the detector at the vehicle 101 detects light from two or more adjacent beams of the guiding device 103 and these beams correspond to angles $\alpha_1, \alpha_2, \alpha_3, \ldots, \alpha_k$ ($k \geq 2$), respectively, the detector should conclude that the angle is $$\frac{\alpha_1 + \alpha_2 + \alpha_3 + \ldots + \alpha_k}{k}$$

for light coming from the guiding device 103.

Example III

Figure 9A:
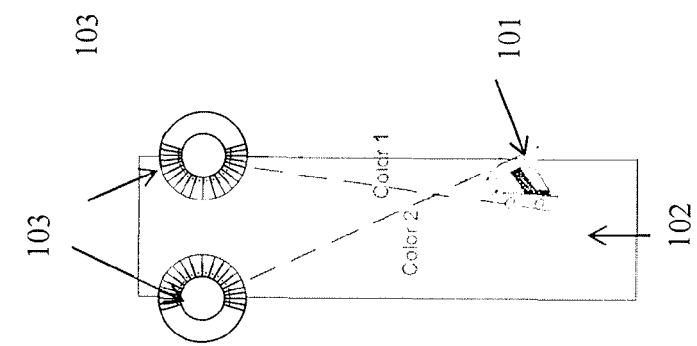
FIGS. 9A-9C are conceptual views of a vehicle incorporating a system in accordance with a representative embodiment.
Figure 9B:
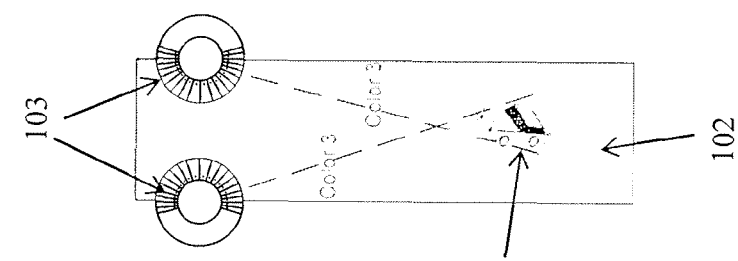
Figure 9C:
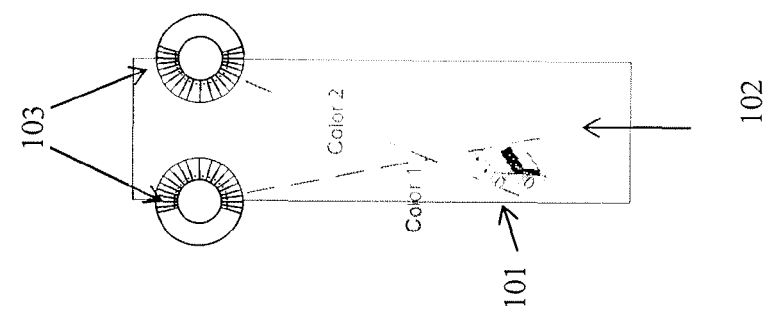

FIGS. 9A-9C are conceptual views of a vehicle 101 incorporating a system in accordance with a representative embodiment. Notably, guiding devices 103 are provided on each side of the roadway 102.

In FIG. 9A, the color of the light received at the vehicle from each of the guiding devices is the same. This indicates that the vehicle 101 is in the center of the lane and therefore no adjustments need to be made by the driver. The detection of the light may be visual (i.e., the driver sees the same color from each guiding device 103) or may be detected by a detector (e.g., detector 303) provided in the vehicle. As described more fully above, the vehicle location in the center of the lane may be provided on a display in the vehicle 101.

In FIG. 9B, the vehicle 101 receives a different color of light from each guiding device 103. In this case, the pair of colors indicates that the vehicle is to the left of center of the lane. Again, the detection of the light may be visual (i.e., the driver sees the two different colors from the guiding devices 103) or may be detected by a detector (e.g., detector 303) provided in the vehicle. As described more fully above, the vehicle location left of the center of the lane may be provided on a display in the vehicle 101.

In FIG. 9C the vehicle 101 receives a different color of light from each guiding device 103. In this case, the pair of colors indicates that the vehicle is to the right of center of the lane. Again, the detection of the light may be visual (i.e., the driver sees the two different colors from the guiding devices 103) or may be by a detector (e.g., detector 303) provided in the vehicle. As described more fully above, the vehicle location right of the center of the lane may be provided on a display in the vehicle 101.

Example IV

FIG. 10 is a conceptual view of a vehicle 101 incorporating a system in accordance with a representative embodiment. Notably, guiding device 103 is omnidirectional and comprises a single light source over a selected angular width toward the roadway 102. The guiding device 103 may be as described in connection with embodiments of FIGS. 2E and 2F. The guiding device 103 is configured to emit light having a unique characteristic. For example, the guiding device 103 may emit light having a unique wavelength, or light having a unique polarization direction, or light having a unique code (e.g., modulated light).

In the representative embodiment the direction of travel of the vehicle 101 and a first edge 1002 and a second edge 1003 of the roadway 102 are determined from GPS coordinates. For example, the direction of travel of the vehicle 101 can be obtained by a GPS device on the vehicle 101 fairly accurately, and the first and second edges 1002, 1003, respectively, can be stored in road map at the vehicle or transmitted from the guiding device 103.

As shown in FIG. 10, $\gamma_0$ denotes the angle between the moving direction of the vehicle and the direction of road edge 1002. If these two directions are parallel, i.e., the vehicle keeps going forward on the roadway 102 and not drift right or left, $\gamma_0$ is can be approximated to zero.

The guiding device 103 is provided along the first edge 1002 of the roadway 102. In this example, the vehicle 101 travels from point A to point B on the roadway 102 as depicted in FIG. 10. At point A, light of a unique characteristic (e.g., unique wavelength) is detected by the light sensor 302 at an angle $\alpha_1$. At point B, light of the same characteristic is detected by the light sensor 302 at an angle $\alpha_1 + \beta_1$. The processor 301 determines the angle $\beta_1$. The angle $\gamma_1$ represents the angle between the guiding device 103 and the vehicle 101 moving direction. The processor 301 then calculates the distance between point A and point B and determines lengths $O_1A$ and $O_1B$ using the triangular relationship. Points $O_1A$ and $O_1B$ represent the position of the vehicle 101. The processor 301 determines the position of the vehicle 101, converts this to location coordinates (e.g., GPS coordinates), and displays the position of the vehicle on the display system 306.

Notably, $\beta_1 = \gamma_3 - \gamma_1$; $\alpha_1 = \gamma_1 - \gamma_0$. In this case, the distance from point A to the first edge 1002 of the roadway 102 is given by $O_1A\sin(\alpha_1)$; and the distance from point B to the first edge 1002 of the roadway 102 is $O_1B\sin(\alpha_1+\beta_1)$

Example V

Figure 11:
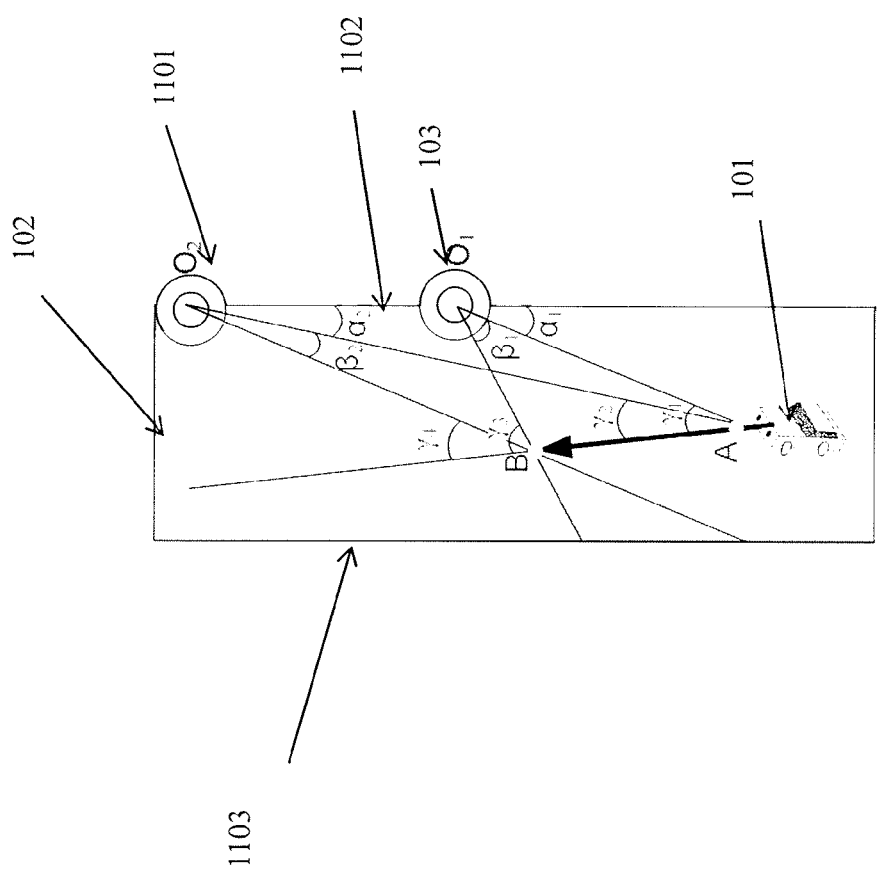
FIG. 11 is a conceptual view of a vehicle incorporating a system in accordance with a representative embodiment.

FIG. 11 is a conceptual view of a vehicle 101 incorporating a system in accordance with a representative embodiment. Notably, first guiding device 103 and a second guiding device 1101 are provided on the first edge 1102 of the roadway 102. The first guiding device 103 is omnidirectional and comprises a single light source over a selected angular width toward the roadway 102. The first guiding device 103 and the second guiding device 1101 may be as described in connection with embodiments of FIGS. 2E and 2F. The first guiding device 103 is configured to emit light having a unique characteristic. The second guiding device 1101 is also configured to emit light having a unique characteristic (different than the unique characteristic of light from the first guiding device 103). For example, the second guiding device 1101 may emit light having a unique wavelength, or light having a unique polarization direction, or light having a unique code (e.g., modulated light).

Notably, the selected characteristic of the first and second guiding devices 103, 1101, is the same, albeit unique. For example, first guiding device 103 may be configured to emit light having a first wavelength, and the second guiding device 1101 may be configured to emit light having a second wavelength that is different than the first wavelength. Alternatively, first guiding device 103 may be configured to emit light having a first polarization direction, and the second guiding device 1101 may be configured to emit light having a second polarization direction that is different than the first polarization direction. Still alternatively, first guiding device 103 may be configured to emit light having a first code, and the second guiding device 1101 may be configured to emit light having a second code that is different than the first code.

The first guiding device 103 is provided along the first edge 1102 of the roadway 102. In this example, the vehicle 101 travels from point A to point B on the roadway 102 as depicted in FIG. 10. At point A, light of a unique characteristic (e.g., unique wavelength) from guiding device 103 is detected by the light sensor 302 at an angle $\alpha_1$, and light of a unique characteristic (e.g., unique wavelength) from guiding device 1101 is detected by the light sensor 302 at an angle $\alpha_2$. At point B, light of the unique characteristic from guiding device 103 is detected by the light sensor 302 at an angle $\beta_1$, and light of the unique characteristic from guiding device 1101 is detected by the light sensor 302 at an angle $\beta_2$.

Given $\beta_1 = \gamma_3 - \gamma_1$

The distance from guiding device 103 to points A and B are, respectively:

$$O_1A = AB\frac{\sin(\gamma_3)}{\sin(\beta_1)}; O_1B = AB\frac{\sin(\gamma_1)}{\sin(\beta_1)}.$$

Given $\beta_2 = \gamma_4 - \gamma_2$

The distance from guiding device 1101 to points A and B are, respectively, $$O_2A = AB\frac{\sin(\gamma_4)}{\sin(\beta_2)}; O_2B = AB\frac{\sin(\gamma_2)}{\sin(\beta_1)}.$$

The distance between the fist guiding device 103 and the second guiding device 1101 is given by:

$$O_1O_2 = \sqrt{O_1A^2 + O_2A^2 - 2 \times O_1A \times O_2A \times \cos(\gamma_1 - \gamma_2)}$$

where $\alpha_1 = \arcsin\left(\frac{O_2A}{O_1O_2}\sin(\gamma_1 - \gamma_2)\right)$ It follows that the distance from point A to the first edge 1102 of the roadway 102 is $O_1A\sin(\alpha_1)$ and the distance from point B to the first edge 1102 of the roadway 102 is $O_1B\sin(\alpha_1+\beta_1)$.

Once the distance from points A and B to the first edge 1102 of the roadway 102 is determined, the relative position of the vehicle 101 to the second edge 1103 of the roadway 102 can be determined. This information can be used to determine if the vehicle 101 is properly located on the roadway 102, or if the vehicle 101 is off the roadway 102. The calculations of the distances between the vehicle 101 and the first edge 1102 of the roadway 102, and the determination of the position of the vehicle 101 on the roadway 102 can be made by processor 301, 401 or a processor of the outdoor lighting network.

Example VI

Figure 12:
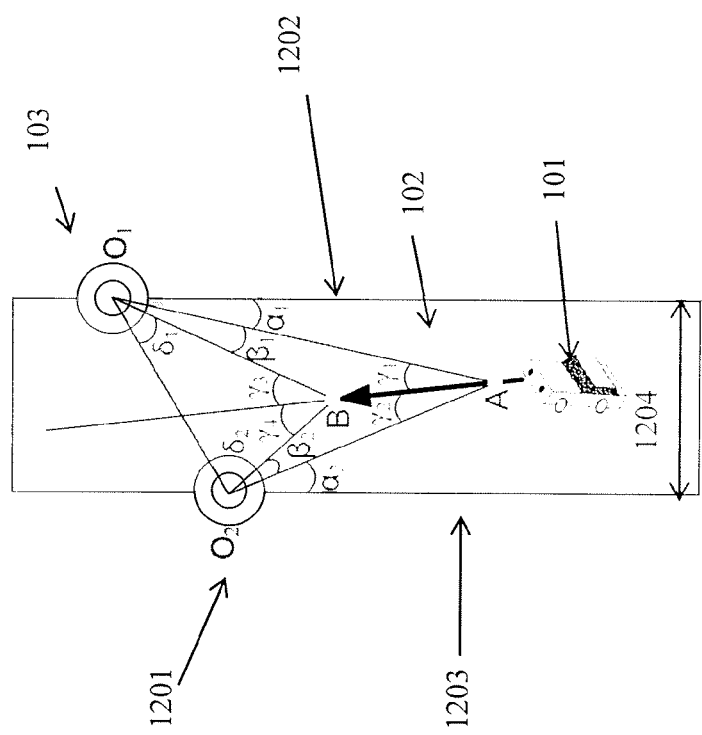
FIG. 12 is a conceptual view of a vehicle incorporating a system in accordance with a representative embodiment.

FIG. 12 is a conceptual view of a vehicle 101 incorporating a system in accordance with a representative embodiment. Notably, first guiding device 103 is provided on the first edge 1202 and a second guiding device 1201 is provided on a second edge 1203 of the roadway 102. The first guiding device 103 is omnidirectional and comprises a single light source over a selected angular width toward the roadway 102. The first guiding device 103 is configured to emit light having a unique characteristic. The second guiding device 1201 is also omnidirectional and comprises a single light source over a selected angular width toward the roadway 102. The first and second guiding devices 103, 1201 may be as described in connection with embodiments of FIGS. 2E and 2F. The second guiding device 1201 is configured to emit light having a unique characteristic (and therefore is different than the unique characteristic of light from the first guiding device). For example, the second guiding device 1201 may emit light having a unique wavelength, or light having a unique polarization direction, or light having a unique code (e.g., modulated light).

Given $\beta_1 = \gamma_3 - \gamma_1$ then $O_1A = AB\frac{\sin(\gamma_3)}{\sin(\beta_1)}; O_1B = AB\frac{\sin(\gamma_1)}{\sin(\beta_1)}.$ Given $\beta_2 = \gamma_4 - \gamma_2$ then $O_2A = AB\frac{\sin(\gamma_4)}{\sin(\beta_2)}; O_2B = AB\frac{\sin(\gamma_2)}{\sin(\beta_1)}.$ The distance between the fist guiding device 103 and the second guiding device 1201 is given by:

$$O_1O_2 = \sqrt{O_1B^2 + O_2B^2 - 2 \times O_1B \times O_2B \times \cos(\gamma_3 + \gamma_4)}$$

If the lane width 1204 and the relative location between the first guiding device 103 and the second guiding device 1201 from the vehicle 101 are known (in this example first guiding device 103 is located farther down the roadway 102 from vehicle 101 than the second guiding device 1201), either from the map data at the car or from information transmitted from first and second guiding devices 103, 1201, the distance from the vehicle 101 to the first edge 1202 and the distance from the vehicle 101 to the second edge at both point A and point B can be determined as follows:.

$$\delta_1 = \arcsin\left(\frac{O_2B}{O_1O_2}\sin(\gamma_4 + \gamma_3)\right),$$

$$\delta_2 = \arcsin\left(\frac{O_1B}{O_1O_2}\sin(\gamma_4 + \gamma_3)\right) \alpha_1 = \arcsin\left(\frac{LW}{O_1O_2}\right) - \beta_1 - \delta_1$$

$$\alpha_2 = \frac{\pi}{2} + \arccos\left(\frac{LW}{O_1O_2}\right) - \beta_2 - \delta_2$$

As such, the distance from point A to the first edge 1202 of the roadway 102 is given by: $O_1A\sin(\alpha_1)$.

Similarly, the distance from point B to the first edge 1202 of the roadway 102 is given by: $O_1B\sin(\alpha_1+\beta_1)$.

The distance from point A to the second edge 1203 of the roadway 102 is given by $O_2A\sin(\alpha_2)$, and the distance from point B to the second edge 1203 of the roadway 102 is given by: $O_2B\sin(\alpha_2+\beta_2)$ Once the distances from points A and B to the first edge 1202 and the second edge 1203 of the roadway 102 are determined, the relative position of the vehicle 101 to either edge of the roadway 102 can be determined. This information can be used to determine if the vehicle 101 is properly located on the roadway 102, or if the vehicle 101 off the roadway 102. The calculations of the distances between the vehicle 101 and the first edge 1202 of the roadway 102, and between the vehicle 101 and the second edge 1203 of the roadway 102 can be made by processor 301, 401 or a processor of the outdoor lighting network.

The systems, apparatuses and components described in connection with representative embodiments can be implemented using a variety of components and in variant structures. Further, the various systems, apparatuses, components and parameters are included by way of example only and not in any limiting sense. In view of this disclosure, those skilled in the art can implement the present teachings using their own systems, apparatuses, components and parameters, while remaining within the scope of the appended claims.

The invention claimed is:

1. A system for guiding a driver of a vehicle on a roadway, the system comprising:
   a light sensor located at the vehicle configured to detect light transmitted from a guiding device disposed along the roadway;
   a processor configured to determine a position of the vehicleon the roadway based on the detected light;
   wherein the guiding device comprises a plurality of guiding segments, each respective guiding segment is arranged to emit a respective light beam comprising a different respective light characteristic over a different respective angular range; and
   wherein the processor is configured to perform said determination based on the different light characteristic of the light beams and the corresponding angular range of the light beams; and
   wherein the processor further calculates the position of the vehicle on the roadway using a triangular relationship between two or more light beams and the corresponding angular ranges of two or more light beams and the guiding device.

2. A system as claimed in claim 1, further comprising a transmitter configured to transmit the wavelength of the detected light.

3. A system as claimed in claim 1, further comprising a transmitter configured to transmit the position of the vehicle.

4. A system as claimed in claim 1, further comprising a transceiver configured to transmit the position of the vehicle from the vehicle to a receiver not in the vehicle.

5. A system as claimed in claim 1, further comprising an alarm device configured to provide the driver the position of the vehicle.

6. A system as claimed in claim 1, wherein the light is reflected.

7. A system as claimed in claim 1, wherein a wavelength of the detected light is dependent on an angle between the vehicle and the guiding device.

8. A system as claimed in claim 1, further comprising a non-transitory computer-readable memory comprising a location of a guiding device along the roadway.

9. A method of guiding a driver of a vehicle on a roadway, the method comprising:
   receiving light at a light sensor located at the vehicle transmitted from a guiding device located disposed along the roadway;
   based on the received light, determining a position of the vehicle on the roadway; wherein
   the guiding device comprising a plurality of guiding segments;
   each respective guiding segment is arranged to emit a respective light beam comprising a different respective light characteristic over a different respective angular range;
   said determining a position of the vehicle on the roadway is performed based on the different light characteristic of the light beams and the corresponding angular range of the light beams; and
   wherein the processor further calculates the position of the vehicle on the roadway using a triangular relationship between two or more light beams and the corresponding angular ranges and the guiding device.

10. A method as claimed in claim 9, wherein the one or more of said characteristics of the light is one or more polarization angles.

11. A method as claimed in claim 9, further comprising, after the determining, transmitting the position of the vehicle.

* * * * *